No. 840,749. PATENTED JAN. 8, 1907.
H. Z. COBB.
VULCANIZING MOLD.
APPLICATION FILED AUG. 6, 1906.

2 SHEETS—SHEET 1.

WITNESSES:
Fred White
René Muine

INVENTOR:
Henry Z. Cobb,
By Attorneys.

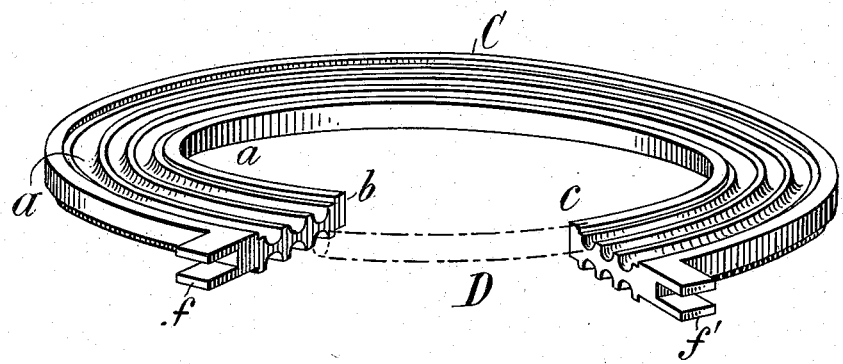
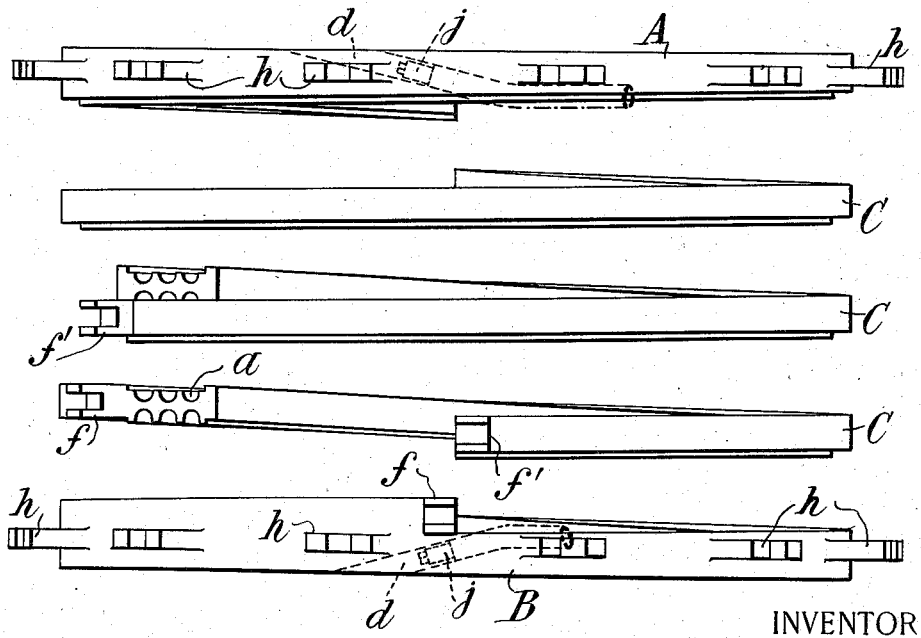

UNITED STATES PATENT OFFICE.

HENRY Z. COBB, OF CHELSEA, MASSACHUSETTS, ASSIGNOR TO REVERE RUBBER COMPANY, OF BOSTON, MASSACHUSETTS, A CORPORATION OF MASSACHUSETTS.

VULCANIZING-MOLD.

No. 840,749.   Specification of Letters Patent.   Patented Jan. 8, 1907.

Application filed August 6, 1906. Serial No. 329,402.

*To all whom it may concern:*

Be it known that I, HENRY Z. COBB, a citizen of the United States, residing in Chelsea, in the county of Suffolk and State of Massachusetts, have invented certain new and useful Improvements in Vulcanizing-Molds, of which the following is a specification.

In United States Letters Patent No. 792,198, granted to me on June 13, 1905, I described and claimed an improved vulcanizing-mold for rubber hose or similar articles, by means of which a continuous hose of practically any desired length can be vulcanized. The mold therein claimed is formed with a molding-face which extends sinuously and continuously through the mold, the latter being constructed of a number of sections which are piled flatwise one upon the other and which are so formed that the mold can be built up to any extent by the addition of successive sections while introducing the hose.

My present invention relates generally to this type of mold, and aims to provide a mold which shall attain certain advantages in construction and operation.

By my present invention I provide a mold in which the intermediate section or sections are recessed, so as to permit the sidewise introduction of the hose to the molding-face, whereby the mold may be built up without reference to the position of the end of the hose. In its preferred form each section is constructed in annular shape, with a portion cut away to form two opposing ends, the sections being preferably of true spiral form, so that the entire number of sections may be identical in shape, thus making them interchangeable and lowering the cost of manufacture.

Figure 1:
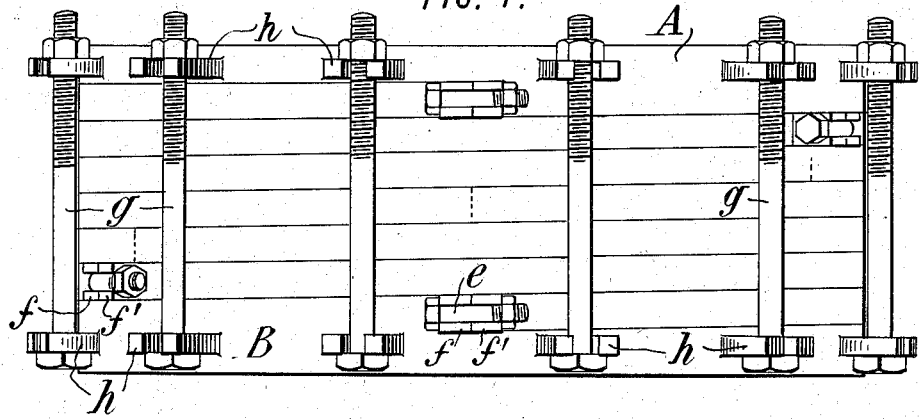
Figure 2:
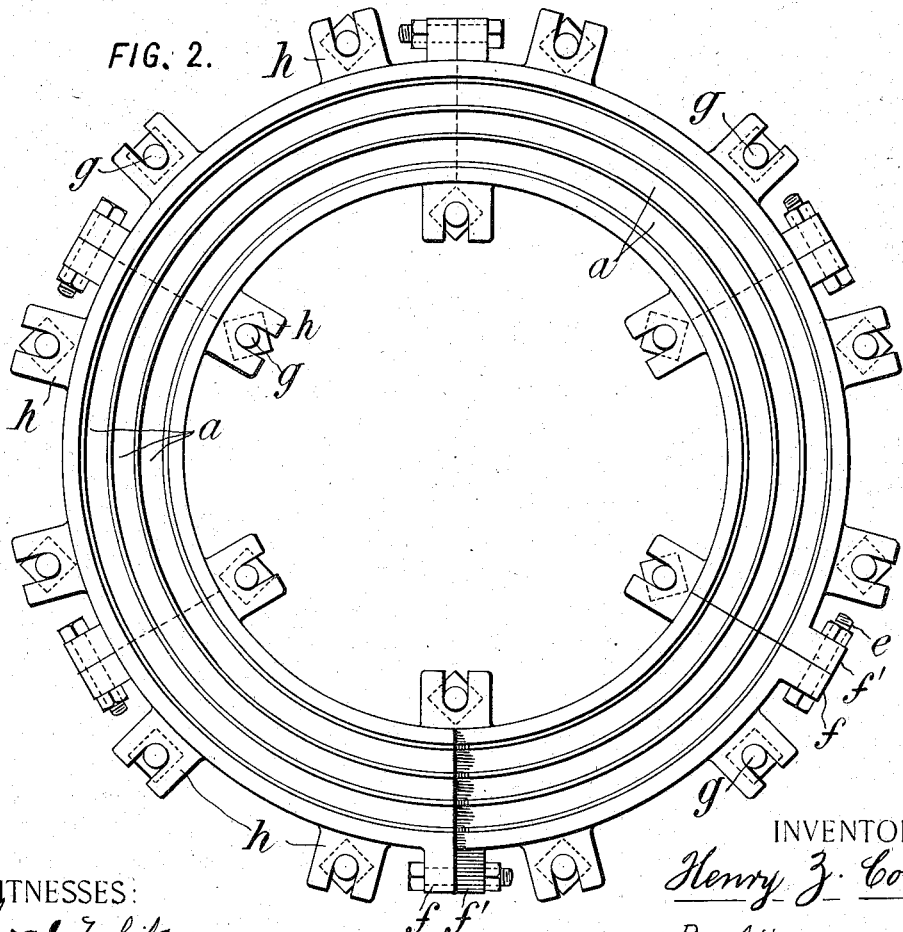

In the drawings, wherein I have shown the preferred form of my invention, Figure 1 is a side elevation of a complete mold embodying my invention. Fig. 2 is a plan of Fig. 1 with the upper section removed. Fig. 3 is a perspective view of one of the intermediate sections. Fig. 4 is a view in elevation, showing the several sections of the mold separated.

As shown in the drawings, the mold is built up of a series of sections, the upper and lower of which (indicated at A and B, respectively) are of different construction from the intermediate sections C C, being designed to form caps or end plates between which the intermediate sections are clamped. Each of the sections is formed with a molding-face of the desired contour for the article to be molded, such molding-faces being arranged on opposing sides of the adjacent sections, so that when brought together they register to form a complete mold. For molding rubber hose or the like such molding-faces will take the form of semicircular grooves $a$. In this case each of the sections C is preferably formed with a mold-groove on each side, that upon its lower side registering with the groove of the section beneath it and that upon its upper side with the groove of the section above it. It is essential that the two ends of the molding-face of each section shall lie in different planes, so that the lower end of the molding-face of one section shall connect with the upper end of the molding-face of the section next beneath it. By this means a molding passage or chamber is formed between the adjacent sections, which extends continuously and sinuously throughout the mold, the length of which is limited only by the number of sections employed, so that a hose or other article of any practical length may be vulcanized in one piece. Preferably each section is formed with a plurality of grooves $a$, so that more than one molding-passage is formed, such grooves being arranged side by side, as best shown in Fig. 3.

My invention introduces an important improvement in this type of mold whereby the rubber hose or other article to be molded may be easily and conveniently placed within the mold while the latter is being built up. This desirable result is obtained in the present construction by providing each of the intermediate sections C with a gap or recess which is adapted to permit the sidewise introduction of the hose to the mold-groove or other molding-face. Such recess is best illustrated in Fig. 3, where it is indicated by the letter D. In the particular form shown in the drawings each of the intermediate sections is constructed as a flat annular body, and in this construction the recess D is best made by cutting away a portion of the ring, so as to form two opposing ends $b$ $c$, separated from each other a sufficient distance to permit the sidewise introduction and removal of the hose. The hose, which is shown in dotted lines in this figure, will be seen to extend at this point from the mold-groove upon the lower side of the section to that upon the upper side of the latter. The sections are preferably so formed that the mold-grooves are respectively at their highest and lowest planes at the ends b c, as shown. It is obvious that the recess D may be of any desired size so long as it is capable of permitting the passage of the hose through it. For instance, the section C instead of being made to extend around the major portion of a circle may be made semicircular or even of less extent, the space between these ends constituting, in effect, what I term the "recess." Neither is it necessary that the mold-groove or molding-face should be completely interrupted, as shown. It is only requisite that the metal shall be cut away sufficiently to permit the passage of the hose to the groove. Preferably I adopt the annular form shown for the sections C; but of course it will be understood that such sections may be of any desired shape, and the molding-faces instead of extending in general circular direction, as shown, may be disposed in any manner about the faces of the mold-sections, so long as they extend continuously through the mold and are so constructed that a passage is provided for the introduction of the article to be molded, without requiring that the latter shall be threaded endwise through the sections. By preference, however, I form each section C, so far as its effective molding-surface is concerned, as a true spiral, as best seen in Fig. 3. This is of particular importance in connection with the mold provided by my present invention in that it enables me to construct all of the sections C of precisely the same shape, so that they may be much more economically manufactured. It will be observed that as the sections are imposed one upon the other the end c of each section is placed in contact with the end b of the section next below it, the under side of each end c bridging the recess D, formed in the next lower section. In effect, therefore, each section is turned angularly to the one next below it to an extent equal to that of the recess D. This angular displacement of the successive sections has no effect upon the continuity of the mold if the sections are of true spiral or other analogous form, since the sections fit upon each other irrespective of the relative positions in which they are placed. This would not be true of the form of section illustrated in my aforesaid patent, wherein the principal portion of the section is flat, the incline or rise being confined to a small part of the section. This form of section, however, may be adapted to my invention by constructing the successive sections in series order, the incline of each section being formed at such point thereon as will compensate for an angular displacement of the section. In this case, however, the sections would not be interchangeable, but must be used in serial order. Other forms may be adopted by suitably shaping the successive sections.

It is obvious that the mold may be entirely built up of sections, such as C; but I prefer to utilize upper and lower sections A and B, as before stated, and to form these without recesses, since there is no necessity of introducing the hose laterally through these sections.

In operation the lengths of unvulcanized hose are coiled in suitable buckets or receptacles, and when it is desired to place them in the mold the free ends of the hose are inserted in suitable recesses d in the base-section B, such ends being provided each with a plug or nozzle j, through which water or other fluid may be admitted to the interior of the hose. The base B may be mounted upon a suitable turn-table or bearing, so that the mold may be rotated while the hose is laid along the mold-grooves. After the grooves of the base B are filled a section C is fitted upon the base, the hose being passed into the recess D and laid along the upper grooves of the section C, the rotation of the mold being continued and the successive sections being applied until the requisite length of hose is laid in and the mold built up to the desired extent. As each section is added or at some time thereafter it may be bolted to the next lower section by means of bolts e passing through lugs f f', so that the sections are prevented from being accidentally displaced. When the last section is added, the top A is applied and the entire mold bolted together by a series of bolts g passing through lugs h, formed in the top and bottom sections. Water or other fluid is then introduced into the hose through the nozzles j, which are then closed and the mold placed in an oven and subjected to the usual vulcanizing temperature. During vulcanization the water introduced into the hose expands and forms a fluid core, which presses the walls of the hose outwardly into contact with the mold-grooves in a well-known manner.

After vulcanization the mold is taken apart and the hose removed therefrom, during which operation my invention permits the sections to be easily and quickly removed without withdrawing the hose lengthwise from each section.

Although I have described in detail the preferred form of my invention, it is to be understood that I do not wish to be limited thereto, as various changes may be made therein without departing from the invention. While I have described my invention in connection with the form of mold set forth in my aforesaid patent, it is to be noted that it is susceptible of use in connection with molds other than that therein described.

My invention is not confined to molds for vulcanizing rubber hose, but may be utilized with advantage in vulcanizing many other articles, such as rubber tires, &c. It will be understood that the molding-face formed upon the sections may be of any desired contour or be formed wholly upon alternate sections. Each of the sections may be constructed with a molding-face upon one side only, if desired, or each section may be formed in two or more parts. These and other modifications are clearly within the scope of my invention.

What I claim is—

1. A vulcanizing-mold for the purpose set forth, comprising in combination, a plurality of mold-sections separably secured flatwise one upon the other and provided with molding-faces extending continuously and sinuously through the mold, one of such sections having a recess adapted to permit the sidewise introduction of the article to be molded.

2. A vulcanizing-mold for the purpose set forth, comprising in combination, a plurality of mold-sections separably secured flatwise one upon the other, and having a plurality of molding-faces, each of which extends continuously and sinuously through the mold, one of such sections having a recess adapted to permit the sidewise introduction of the article to be molded.

3. A vulcanizing-mold for the purpose set forth, comprising in combination end plates forming mold-sections, and one or more intermediate annular sections, all piled flatwise one upon the other, and separably secured together and such sections being provided with molding-faces extending continuously and sinuously through the mold, and being recessed to permit the sidewise introduction of the article to be molded.

4. In a sectional mold, a section having a molding-face, the ends of which lie in different planes, such ends being sufficiently separated to permit the sidewise passage of the article to be molded to such face.

5. In a sectional mold, a substantially annular section of spiral form recessed to form two opposing ends, such ends being spaced apart sufficiently to permit the introduction between them of the article to be molded.

In witness whereof I have hereunto signed my name in the presence of two subscribing witnesses.

HENRY Z. COBB.

Witnesses:
ARTHUR C. FRASER,
THEODORE T. SNELL.